United States Patent
Foley et al.

(10) Patent No.: US 12,109,865 B2
(45) Date of Patent: Oct. 8, 2024

(54) DEADBEAM BASED REAR SUSPENSION SYSTEM FOR BEV DRIVEN AXLE

(71) Applicant: Ford Global Technologies, LLC, Dearborn, MI (US)

(72) Inventors: Shane Edward Foley, Livonia, MI (US); Jeffrey Michael Hatt, Livonia, MI (US); Geoff Lawrence Gordon, Novi, MI (US); Carl Montgomery, Madison Heights, MI (US); Steve Scott Allen, Saline, MI (US); Derek Moore, Auburn Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/842,277

(22) Filed: Jun. 16, 2022

(65) Prior Publication Data
US 2023/0406055 A1    Dec. 21, 2023

(51) Int. Cl.
*B60G 3/20* (2006.01)
*B60G 7/02* (2006.01)

(52) U.S. Cl.
CPC .................. *B60G 3/20* (2013.01); *B60G 7/02* (2013.01); *B60G 2204/422* (2013.01); *B60G 2300/50* (2013.01)

(58) Field of Classification Search
CPC ........ B60G 3/20; B60G 7/02; B60G 2204/22; B60G 2300/50
See application file for complete search history.

(56) References Cited

U.S. PATENT DOCUMENTS

| | | | |
|---|---|---|---|
| 4,379,572 A * | 4/1983 | Hedenberg | B60G 9/00 280/124.157 |
| 8,733,771 B2 | 5/2014 | Johnson et al. | |
| 8,915,507 B2 | 12/2014 | Helm | |
| 2006/0033298 A1 * | 2/2006 | Longworth | B60G 11/50 280/124.11 |

(Continued)

FOREIGN PATENT DOCUMENTS

| | | | |
|---|---|---|---|
| EP | 3698998 A1 * | 8/2020 | B60G 11/04 |
| EP | 3698998 B1 | 3/2021 | |
| IN | 201821026126 A | 1/2020 | |

(Continued)

OTHER PUBLICATIONS

Hirotaka, 1996, JPH0840031 A machine English translation (Year: 1996).*

*Primary Examiner* — Jason D Shanske
*Assistant Examiner* — Matthew James O'Neill
(74) *Attorney, Agent, or Firm* — Burr & Forman LLP; Lorne Forsythe (57) ABSTRACT

A vehicle suspension system may include a deadbeam extended between a first wheel at a first end of the deadbeam and a second wheel at a second end of the deadbeam, an electric motor disposed forward of the deadbeam, a lateral link operably coupling the deadbeam to a chassis of the vehicle, a first half shaft operably coupled to the first wheel and the electric motor, a second half shaft operably coupled to the second wheel and the electric motor, a first suspension assembly operably coupling the first wheel to the chassis, and a second suspension assembly operably coupling the second wheel to the chassis.

15 Claims, 10 Drawing Sheets

(56) References Cited

U.S. PATENT DOCUMENTS

2014/0306415 A1* 10/2014 Aldrich ............... B60G 15/067
280/124.116
2021/0086834 A1* 3/2021 Azuma ................ B60G 9/025

FOREIGN PATENT DOCUMENTS

IN 202041008383 A 9/2021
JP H0840031 A * 2/1996

* cited by examiner

DEADBEAM BASED REAR SUSPENSION SYSTEM FOR BEV DRIVEN AXLE

TECHNICAL FIELD

Example embodiments generally relate to vehicle suspension and, more particularly, relate to a suspension system that employs deadbeam rear suspension in a battery electric vehicle (BEV).

BACKGROUND

Vehicles commonly employ different types of suspension based on planned usage and performance goals. Accordingly, given that certain vehicle types made by different manufacturers compete with each other in the marketplace, trends can develop whereby certain vehicle types tend to coalesce around using the same types of suspension. Thus, for example, many pickup trucks tend to employ traditional leaf springs and live rear axles for rear suspension instead of independent rear suspension.

All that being said, manufacturers may explore market differentiation avenues by employing a different suspension (or different other features) from time to time. However, braking with traditional norms is sometimes also caused when another major feature change causes a ripple of consequences in vehicle design. The recent drive toward battery electric vehicles (BEVs) is just that type of major change. Converting vehicles to BEV causes (and enables) significant changes to numerous components and system design considerations.

Thus, some changes may be driven by a need to evolve suspension designs to accommodate changes to other design features associated with BEV innovation to ensure that responsiveness to different driving conditions can be maintained for high degrees of driver confidence and enjoyment of the driving experience.

BRIEF SUMMARY OF SOME EXAMPLES

In accordance with an example embodiment, a vehicle suspension system may be provided. The vehicle suspension system may include a deadbeam extended between a first wheel at a first end of the deadbeam and a second wheel at a second end of the deadbeam, an electric motor disposed proximate to the deadbeam, a lateral link operably coupling the deadbeam to a chassis of the vehicle, a first half shaft operably coupled to the first wheel and the electric motor, a second half shaft operably coupled to the second wheel and the electric motor, a first suspension assembly operably coupling the first wheel to the chassis, and a second suspension assembly operably coupling the second wheel to the chassis.

In another example embodiment, a three-link vehicle suspension system may be provided. The system may include a deadbeam extended between a first wheel at a first end of the deadbeam and a second wheel at a second end of the deadbeam, an electric motor disposed forward of the deadbeam, a lateral link operably coupling the deadbeam to a chassis of the vehicle, a first half shaft operably coupled to the first wheel and the electric motor, a second half shaft operably coupled to the second wheel and the electric motor, and first and second suspension assemblies. The lateral link may be a first link of the system. The first suspension assembly may operably couple the first wheel to the chassis. The first suspension assembly may be a second link of the system. The second link may include a first radius arm extending between the chassis and a portion of the deadbeam proximate the first wheel. The second suspension assembly may operably couple the second wheel to the chassis. The second suspension assembly may be a second link of the system. The second link may include a second radius arm extending between the chassis and a portion of the deadbeam proximate the first wheel.

In another example embodiment, a five-link vehicle suspension system may be provided. The system may include a deadbeam extended between a first wheel at a first end of the deadbeam and a second wheel at a second end of the deadbeam, an electric motor disposed forward of the deadbeam, a lateral link operably coupling the deadbeam to a chassis of the vehicle, a first half shaft operably coupled to the first wheel and the electric motor, a second half shaft operably coupled to the second wheel and the electric motor, and first and second suspension assemblies. The lateral link is a first link of the system. The first suspension assembly may operably couple the first wheel to the chassis. The first suspension assembly may include a first upper link that is the second link of the system and a first lower link that is a third link of the system. The second link may pass over the first half shaft and the third link may pass under the first half shaft extending between the chassis and a portion of the deadbeam proximate the first wheel. The second suspension assembly may operably couple the second wheel to the chassis. The second suspension assembly may include a second upper link that is a fourth link of the system and a second lower link that is a fifth link of the system. The fourth link may pass over the second half shaft and the fifth link may pass under the second half shaft extending between the chassis and a portion of the deadbeam proximate the second wheel.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, BEV design changes may cause other innovations to be desirable in order to accommodate the BEV design changes, while maximizing efficiency and performance. One area in which recent changes may cause this effect relates to pickup truck design. After a relatively long period of absence from the marketplace, the rapid uptake of BEV pickup truck demand in the marketplace has taken off. Because BEVs employ a relatively large and heavy battery, design options for locating the battery may be somewhat restricted. With those restrictions, ripple effects may propagate through the rest of the vehicle design. For example, the electric motor for the rear wheels may be moved rearward to be proximate to the wheels. Packaging the electric motor, and enabling it to be mounted to the vehicle frame proximate to the rear wheels to permit the corresponding mass to be effectively sprung creates some rather unique space and structural adjustments to the area in which the rear suspension would normally be provided.

One way to deal with these space considerations may be to consider the use of an independent rear suspension (IRS), an otherwise rarely seen choice for pickup truck designs. Using an IRS may, for example, also provide a lower noise, vibration and harshness (NVH) rating for the vehicle. However, employing an IRS may sacrifice off-road performance. Moreover, a vehicle with an IRS may have an inferior performance in relation to ramp travel index (RTI), which is often a key measure used to rate a suspension design's off-road performance. Thus, it may be desirable to define an updated suspension design that balances good off-road performance with an isolated primary drive unit (PDU) (e.g., an electric motor) on the rear axle. Example embodiments may provide for a rear suspension that employs an electric drive unit (e.g., a PDU) that is mounted to the body or frame of the vehicle along with employing a solid axle connection between wheels and link arms that are operably coupled to a deadbeam. A lateral link may also be provided among other longitudinal links that form the link arms.

As will be seen in connection with detailed discussions of an example embodiment below, the combination of components described in this context provides a number of advantages in performance. The combination also creates the opportunity to incorporate other unique features that further enhance various aspects of performance and robustness. Some of those additional features will be discussed in detail below.

Figure 1:
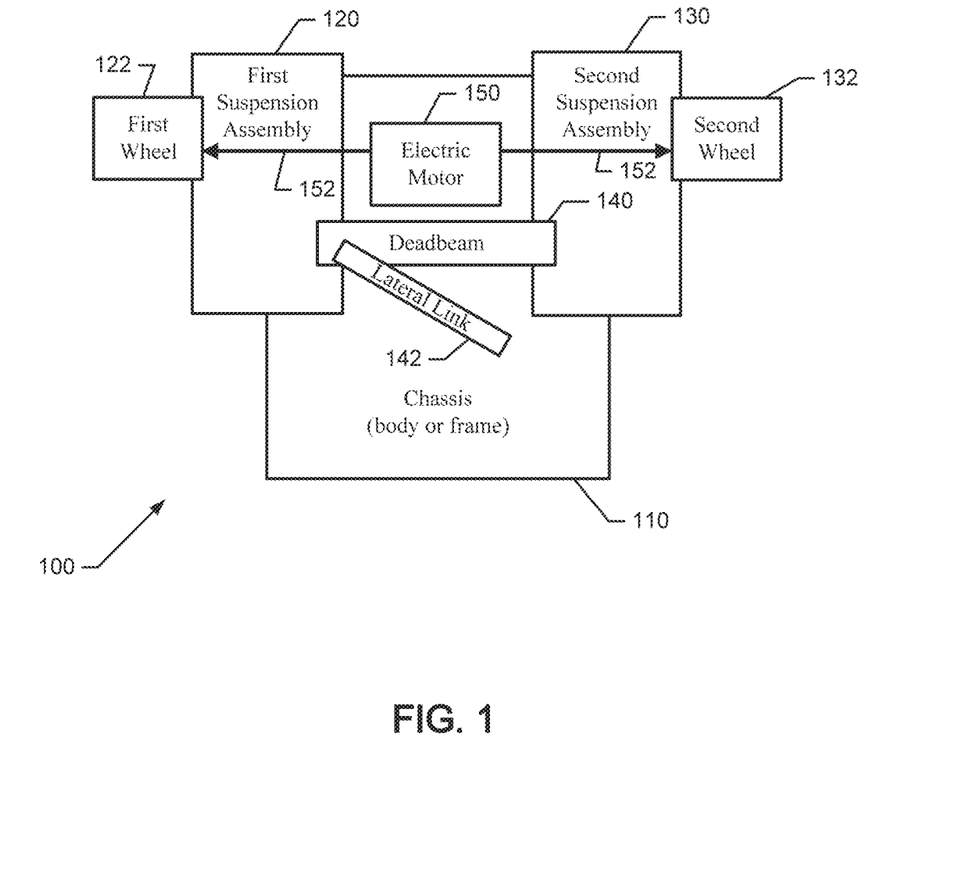
FIG. 1 illustrates a block diagram of a suspension system of a vehicle in accordance with an example embodiment.

FIG. 1 illustrates a block diagram of a vehicle suspension system 100 of an example embodiment. The vehicle suspension system 100 may include multiple components, subsystems or assemblies, which may be operably coupled (and in some cases affixed) to a chassis 110 of the vehicle. Notably, the chassis 110 may be either a body or frame of the vehicle. The vehicle suspension system 100 may include a first suspension assembly 120 that may support a first wheel 122, and a second suspension assembly 130 that may support a second wheel 132.

In an example embodiment, a deadbeam 140 may extend between the first and second suspension assemblies 120 and 130. In an example embodiment, the first and second wheels 122 and 132 may be rear wheels, and thus the first and second suspension assemblies 120 and 130, along with the deadbeam 140, may be understood to be portions of a rear suspension system for respective rear wheels of the vehicle. In an example embodiment, a lateral link 142 (e.g., a Panhard rod, Watt's linkage, Mumford linkage, Scott-Russell linkage or the like) may also be provided to operably couple the deadbeam 140 to the chassis 110. Thus, it should be appreciated that the lateral link need not be a single structure, but could include multiple individual structures coupled together to form a linkage assembly.

In an example embodiment, power to each of the first and second wheels 122 and 132 may be provided by an electric motor 150, which may be mounted to the chassis 110, and therefore be a sprung mass. In some cases, a single instance of the electric motor 150 may provide power to both the first and second wheels 122 and 132 via a solid axle 152 that extends between the first and second wheels 122 and 132 (or knuckles thereof). The chassis 110 may be a ladder frame in some cases, with two longitudinally extending frame members, and any suitable number of transversely extending frame members that operably couple the two longitudinally extending frame members to each other. A body may be operably coupled to the chassis 110 to define a body on frame construction paradigm for the vehicle. Alternatively, the chassis 110 may be a unibody structure.

The first and second suspension assemblies 120 and 130 may substantially mirror each other in arrangement and may form portions of the suspension system of an example embodiment. The first and second suspension assemblies 120 and 130 may take any suitable form and include components associated therewith. Thus, for example, the first and second suspension assemblies 120 and 130 may include shocks, springs, dampers, linkages (e.g., link arms) and/or the like, in any of various arrangements that allow relative motion between the chassis 110 and the respective wheels (i.e. the first and second wheels 122 and 132). However, FIGS. 2-4 will demonstrate some specific examples of block diagrams of specific component combinations that may be used to implement the first and second suspension assemblies 120 and 130, and FIGS. 5-11 show some more detailed views of specific components that may be employed in some example implementations.

Figure 2:
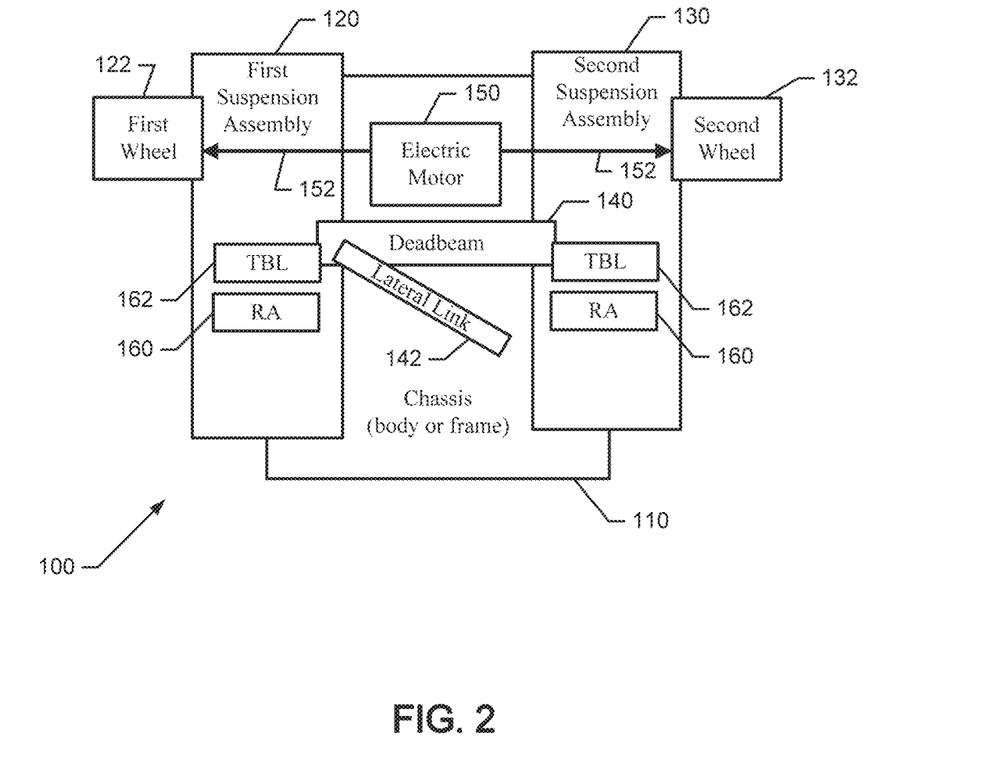
FIG. 2 illustrates a block diagram of a three-link suspension system in accordance with an example embodiment.

Referring first to FIG. 2, the first and second suspension assemblies 120 and 130 may each include a radius arm (RA) 160 and a three-link suspension design (relative to the deadbeam 140) where the first link is the lateral link 142. The radius arm 160 may be positioned as a trailing arm in some cases. The second and third links are each provided as a two-bushing link (TBL) 162 directly to the deadbeam 140 from the radius arm 160.

Figure 3:
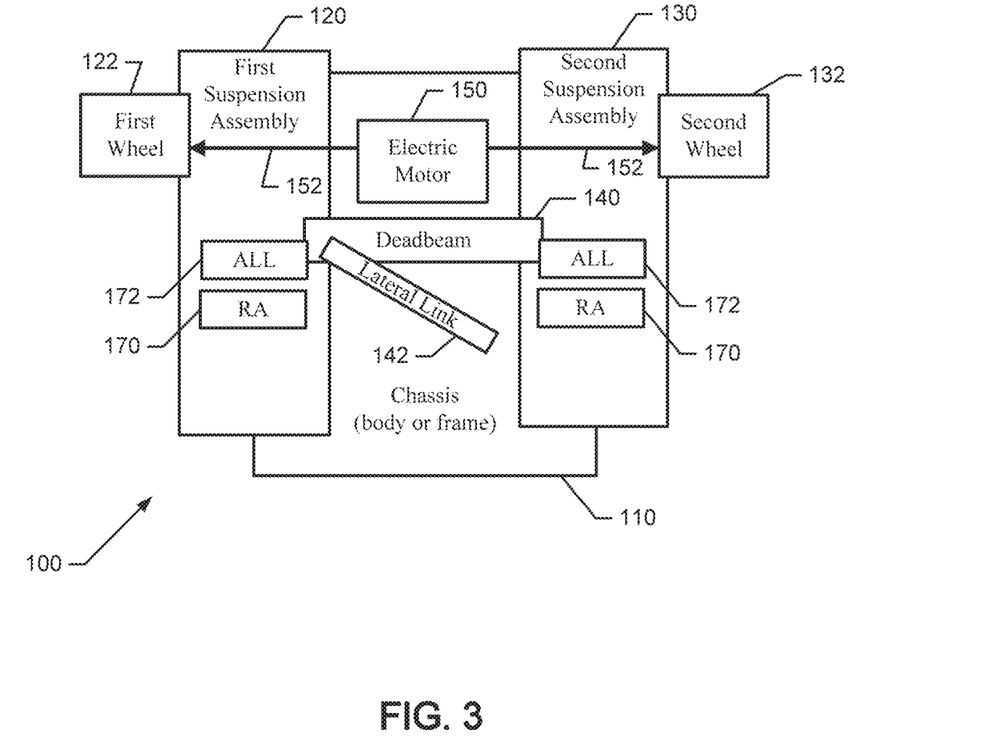
FIG. 3 illustrates a block diagram of an alternative three-link suspension system in accordance with an example embodiment.

Alternatively, in FIG. 3, the first and second suspension assemblies 120 and 130 may each include an alternate three-link suspension design (relative to the deadbeam 140) and may include a radius arm (RA) 170 arranged as a trailing arm. In this alternative example as well, the first link is the lateral link 142. The second link and third links of this example are provided by an articulated longitudinal link (ALL) 172 (or "articulink") that extends between the radius arm 170 on each side (i.e., in each of the first and second suspension assemblies 120 and 130) and the deadbeam 140.

Figure 4:
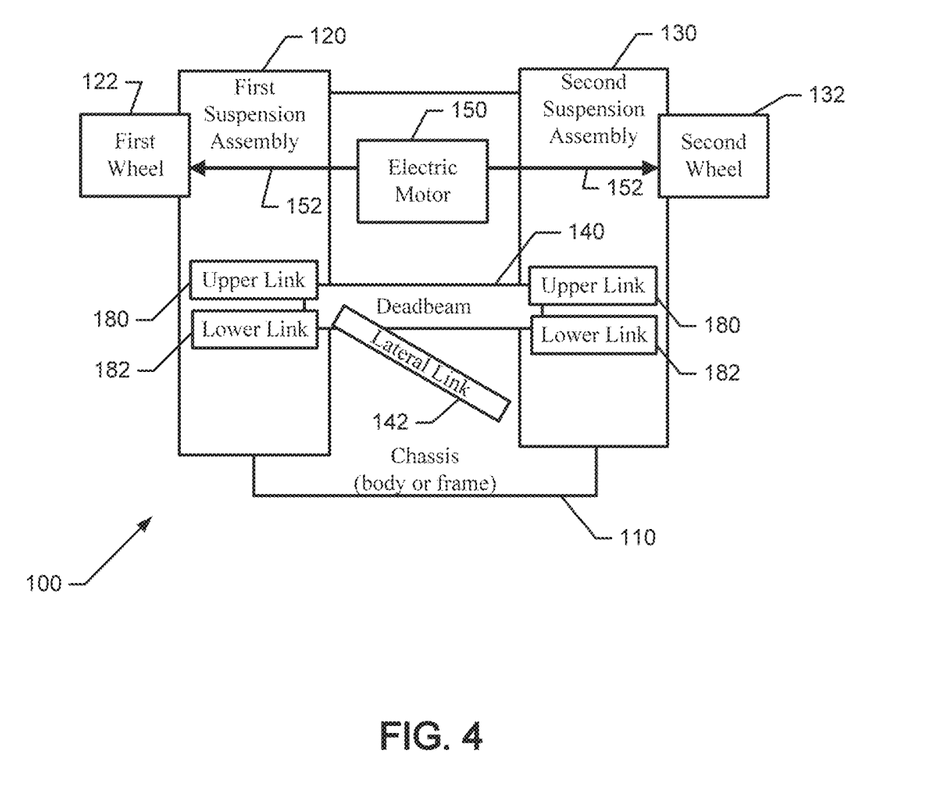
FIG. 4 illustrates a block diagram of a five-link suspension system in accordance with an example embodiment.

FIG. 4 shows yet another example embodiment in which the first and second suspension assemblies 120 and 130 may each include a five-link suspension design where the first link is again the lateral link 142. In the example of FIG. 4, the radius arms described above are replaced by respective upper and lower link arms. Thus, each of the first and second suspension assemblies 120 and 130 includes an upper link 180 between a portion of the chassis 110 and the deadbeam 140. Each of the first and second suspension assemblies 120 and 130 also includes a lower link 182 between a portion of the chassis 110 and the deadbeam 140. In some embodiments, the upper link 180 on each side may be operably coupled (e.g., directly or via a first bracket assembly) to a top portion of the deadbeam 140 and the lower link 182 may be operably coupled (e.g., directly or view a second bracket assembly) to a bottom portion of the deadbeam 140.

As noted above, it can be appreciated that the structures or components that are used to define the vehicle suspension system 100 (and the first and second suspension assemblies 120 and 130 thereof) can vary in different implementations of example embodiments. Thus, FIGS. 5-11 merely illustrate some non-limiting examples of structures that may be employed in an example embodiment. Notably, several components that are not germane to the workings of components discussed herein may be removed, fully or partially, to facilitate better visibility to other components that are discussed herein.

Figure 5:
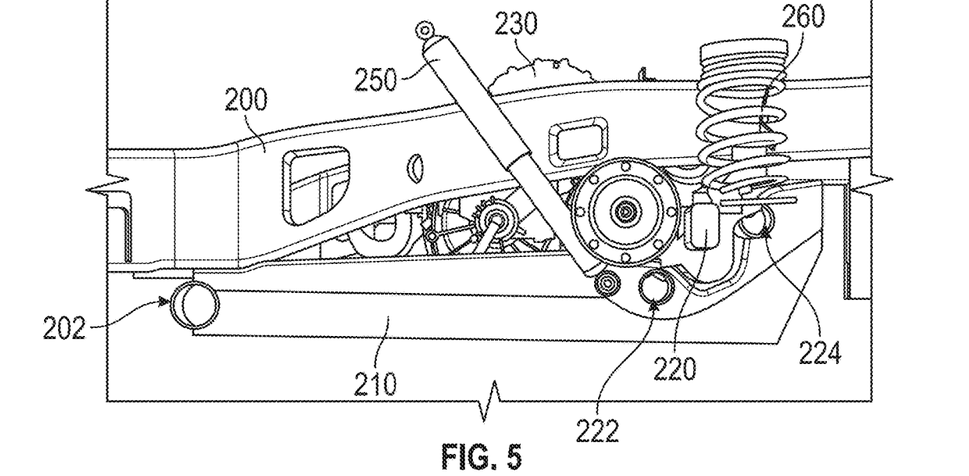
FIG. 5 illustrates a side view of structures that may be used to implement the suspension system of FIG. 2 in accordance with an example embodiment.
Figure 6:
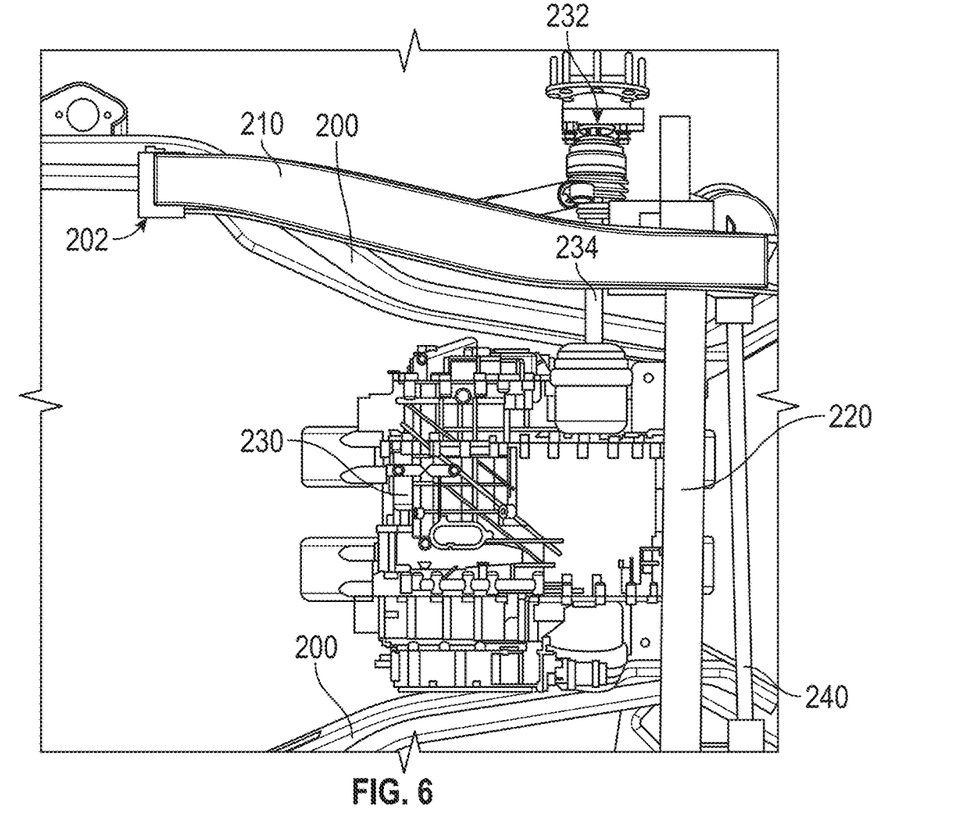
FIG. 6 is a top view of an opposite side of the suspension system of FIG. 5 in accordance with an example embodiment.

Referring first to FIGS. 5 and 6, an example structure for implementing the example embodiment of FIG. 2 above is show. More specifically, FIG. 5 illustrates a side view of one suspension assembly according to an example embodiment, and FIG. 6 shows a top view of the suspension assembly on the opposite side of the vehicle to that shown in FIG. 5. As noted above, the suspension assemblies mirror each other on opposite sides of the vehicle. These suspension assemblies are examples of the first and second suspension assemblies 120 and 130 of FIG. 2 above. Thus, although numbered differently, components sharing the same name as those blocks shown in FIG. 2 should be understood to represent corresponding non-limiting specific physical structures that may be used to embody each respective component.

In this regard, a longitudinal frame member 200 is shown as an example of a portion of the chassis 110 of FIG. 2. Trailing arm 210 is operably coupled to the frame member 200 by a first bushing 202 at a first end thereof. The trailing arm 210 is also operably coupled to deadbeam 220 by a second bushing 222 and a third bushing 224. The deadbeam 220 is routed rearward of an electric motor 230 (e.g., PDU) and is also operably coupled to a corresponding cast knuckle 232 that houses wheel hub, bearings, brakes, etc. for each respective rear wheel. Meanwhile, the solid axle 152 of FIG. 1 is, in this example, embodied in the form of two half shafts 234 that extend from opposite lateral sides of the electric motor 230 to be operably coupled to the corresponding knuckle 232 on each opposing side of the vehicle. In some cases, the deadbeam 220 may be linear over an entirety of the distance between the two half shafts 234. Each instance of the knuckle 232 is in turn operably coupled to a corresponding rear wheel of the vehicle. The lateral link 142 of FIG. 2 is embodied in this example as a Panhard rod 240, which is operably coupled at one end thereof to the deadbeam 220, and at the other to the chassis, for example, at a portion of one of the longitudinal frame members 200.

Other suspension components including a damper or shock absorber 250 and a spring assembly 260 may also be provided in some cases. In this example, the shock absorber 250 may be operably coupled to the trailing arm 210 at one end thereof, and to a portion of the frame or body (e.g., chassis) at the other end thereof. The shock absorber 250 in this example extends forward from the trailing arm 210 to the chassis, and the spring assembly 260 may be mounted at a portion of the deadbeam 220, and extend vertically (or slightly rearward) toward a portion of the frame or body (e.g., chassis).

In the example of FIGS. 5 and 6, the second and third bushings 222 and 224 at each opposing end of the deadbeam 220 may operate to react torque. Meanwhile, the Panhard rod 240 provides lateral link functionality that gives lateral stiffness to the design. Whereas mechanically coupled front and rear axles associated with all-wheel drive (AWD) and four-wheel drive (4WD) vehicles can employ the mechanical coupling to transfer torque mechanically between the front and rear of the vehicle, BEVs generally do not include this type of torque transfer capability between front and rear axles. Accordingly, to maintain the same wheel torque to the ground in as many positions as possible, example embodiments such as that of FIGS. 5 and 6 (as well as those of FIGS. 7-11) may be employed.

Figure 7:
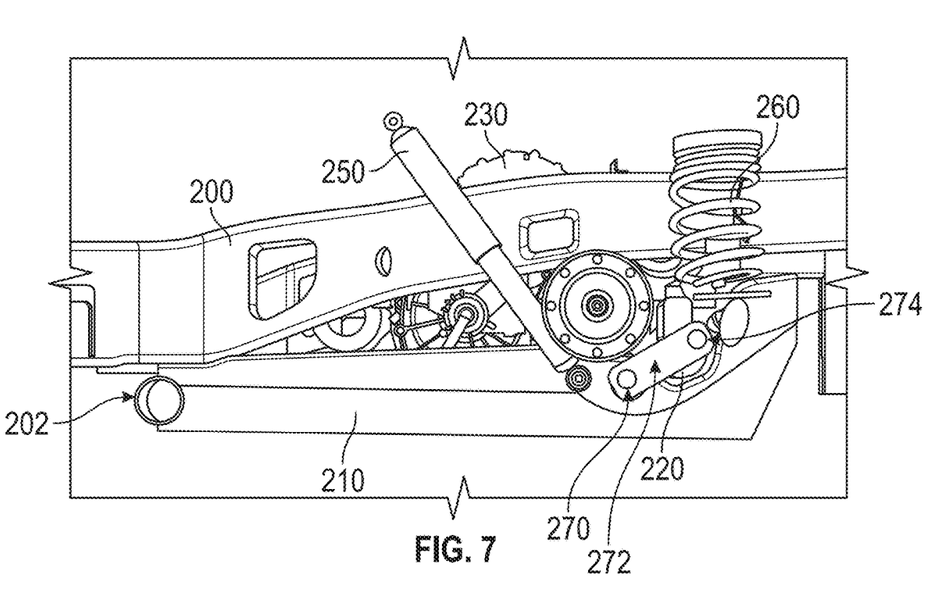
FIG. 7 is a side view of structures that may be used to implement the suspension system of FIG. 3 in accordance with an example embodiment.
Figure 8:
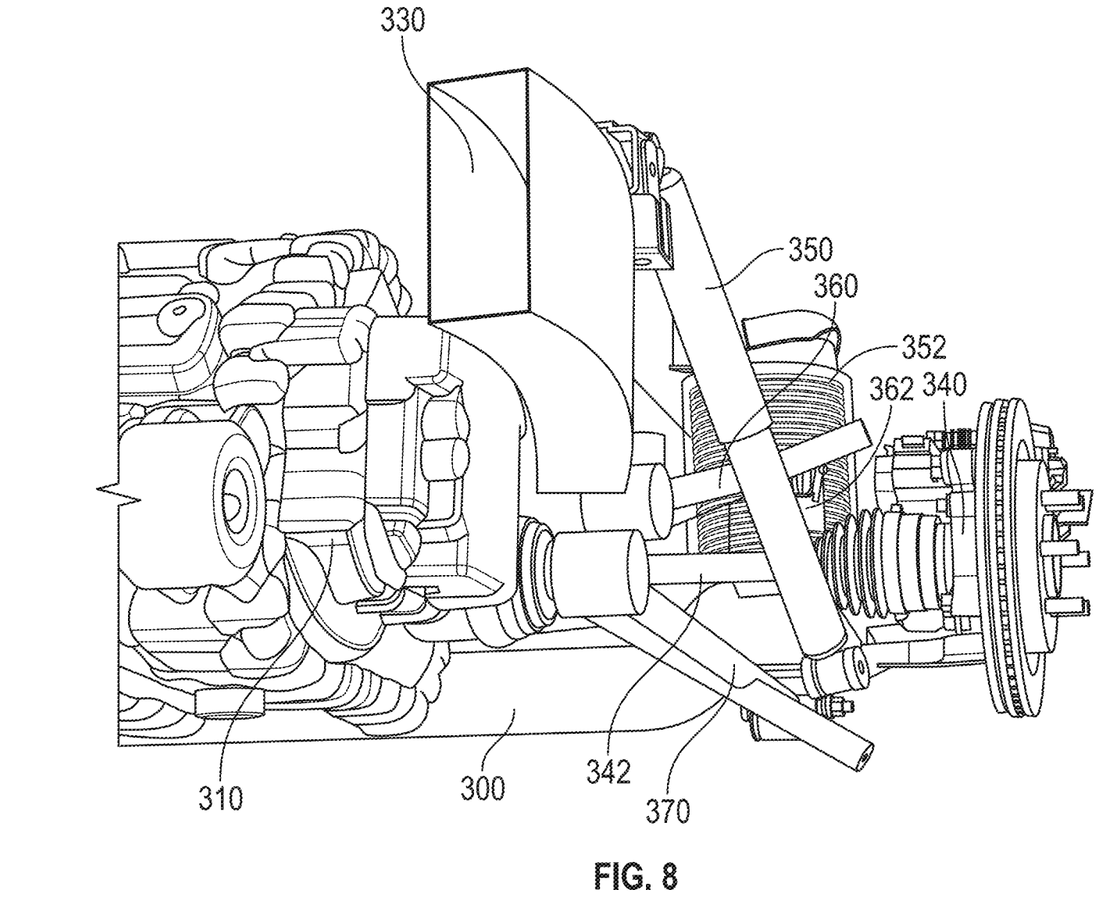
FIG. 8 is a front perspective view of structures that may be used to implement the five-link suspension system of FIG. 4 in accordance with an example embodiment.
Figure 9:
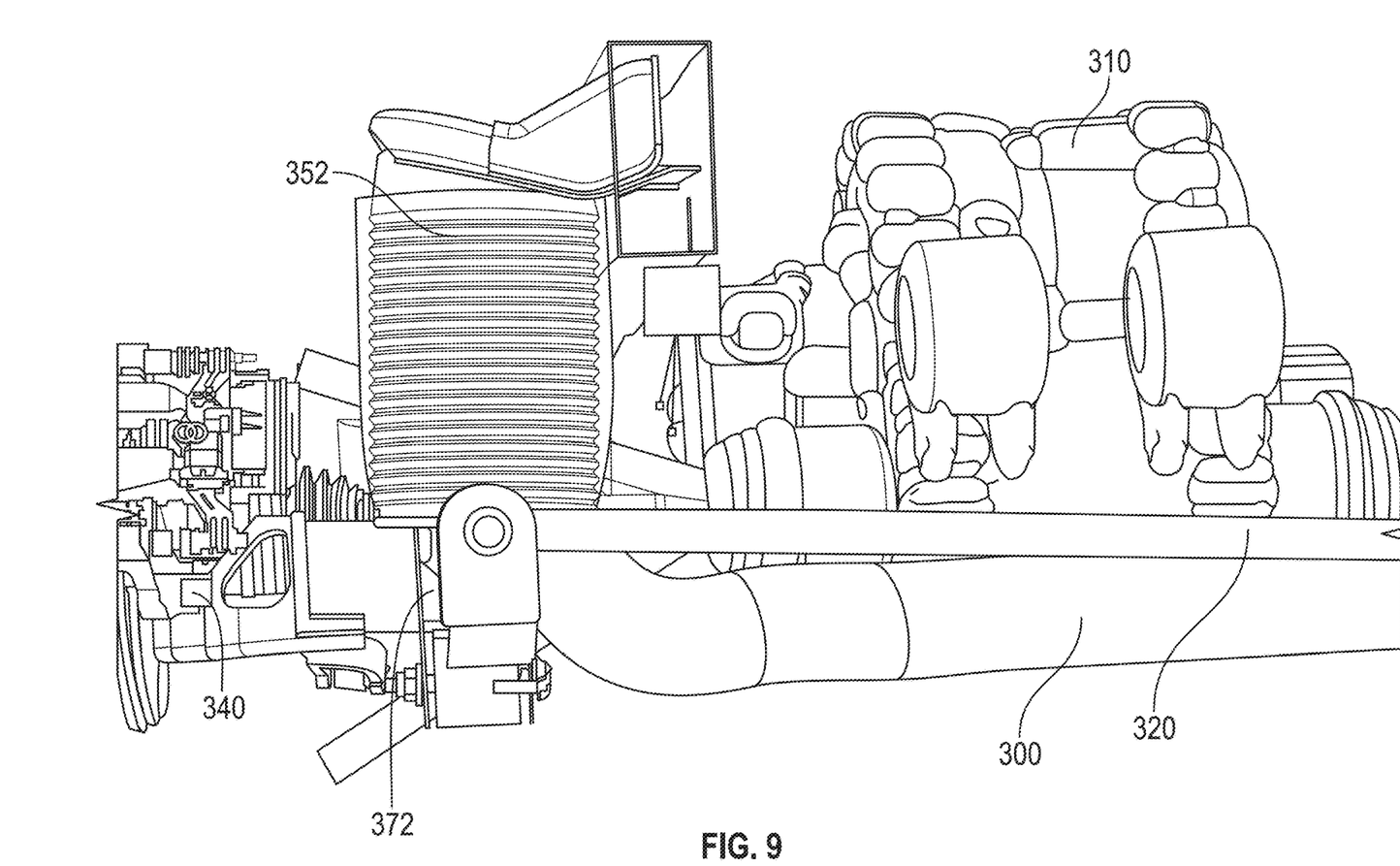
FIG. 9 is a rear view of the suspension system of FIG. 8 in accordance with an example embodiment.
Figure 10:
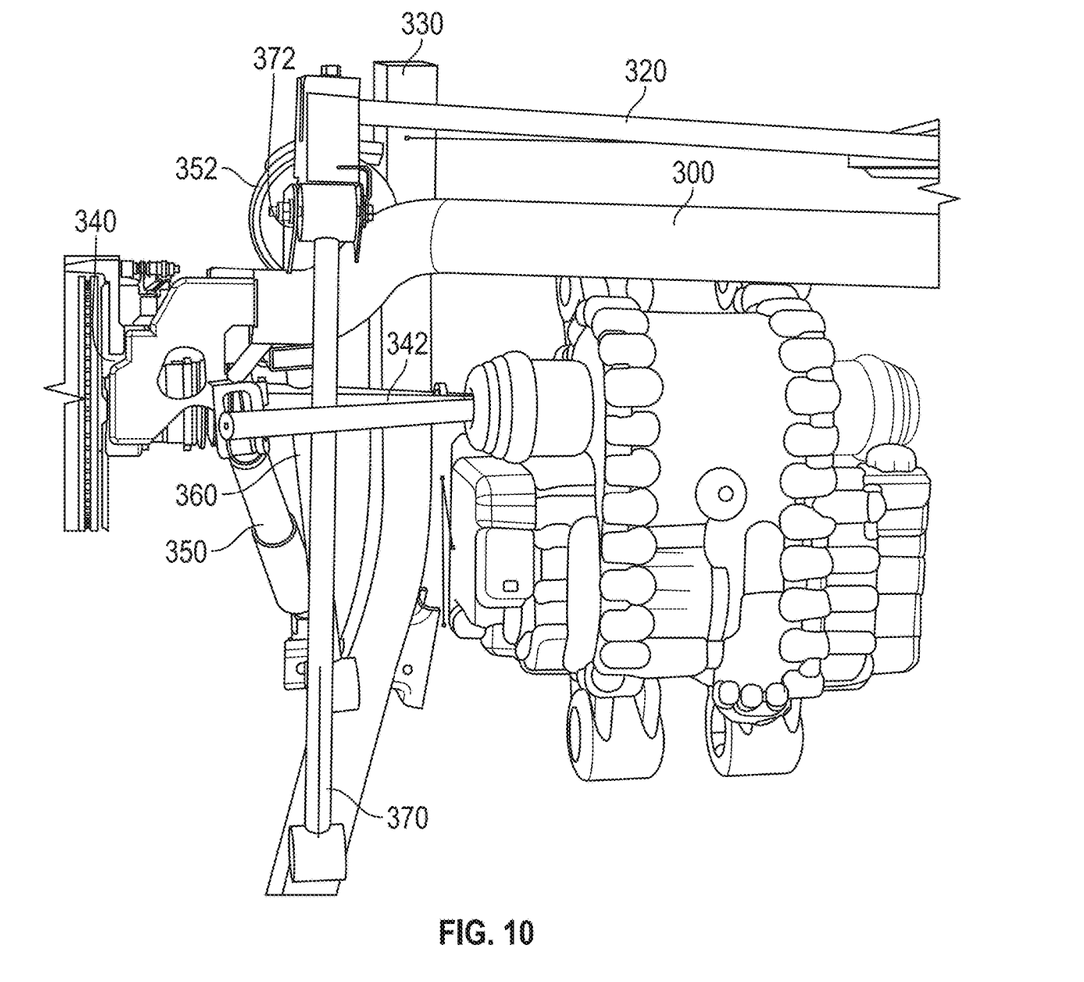
FIG. 10 is a bottom view of the suspension system of FIGS. 8 and 9 in accordance with an example embodiment.
Figure 11:
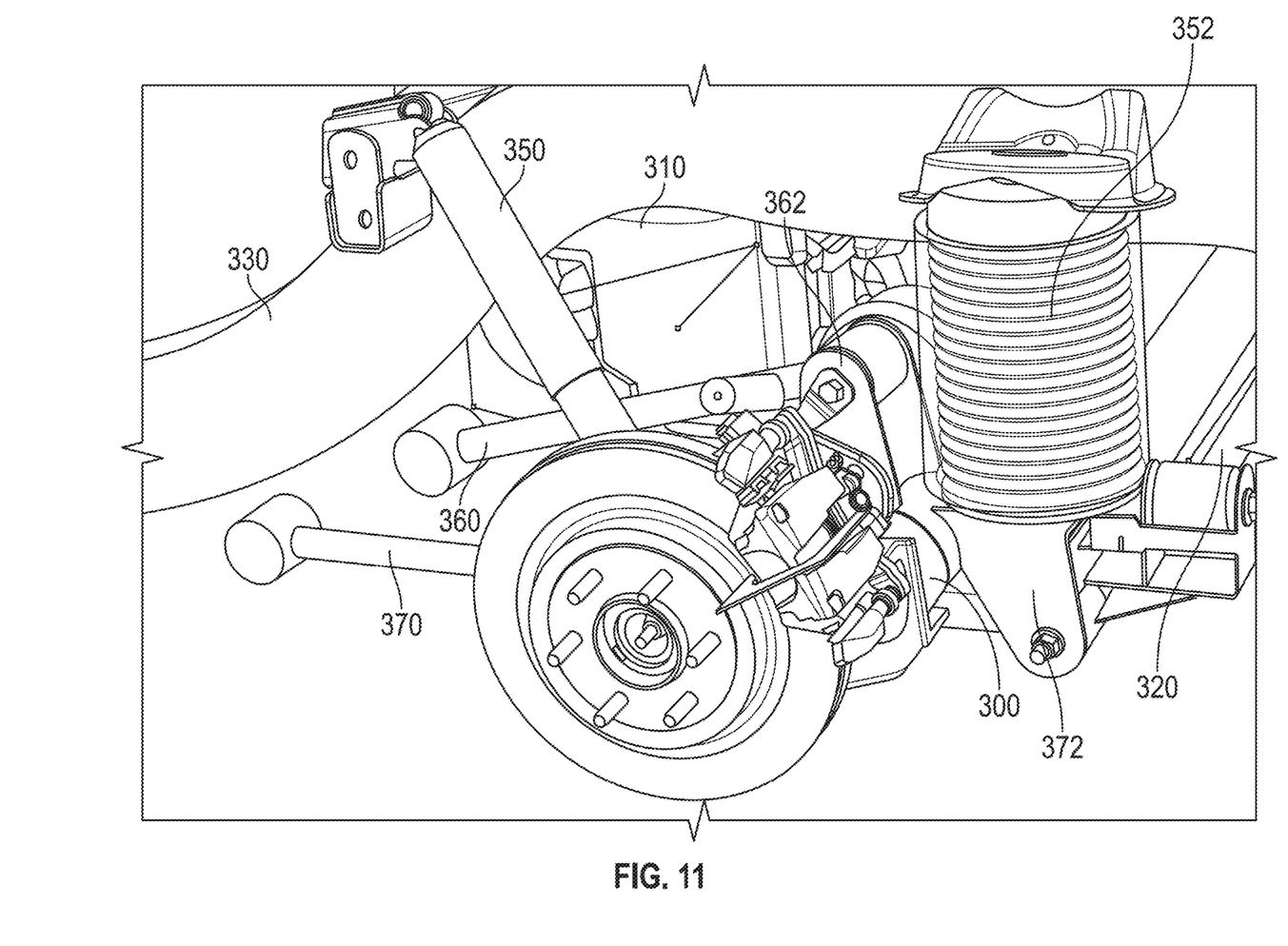
FIG. 11 is a side view of the suspension system of FIGS. 8-10 in accordance with an example embodiment.

FIG. 7 illustrates a slight modification to the design of the example of FIGS. 5 and 6 in that the coupling between the deadbeam 220 and the trailing arm 210 (e.g., second and third bushings 222 and 224) is changed. The example of FIG. 7 also corresponds to the block diagram view of FIG. 3, but demonstrates specific structural components that may be used to embody various ones of the blocks of FIG. 3. In this regard, in the example of FIG. 7, a decoupling link bushing 270 of the trailing arm 210 (which corresponds to the second bushing 222 of the example of FIGS. 5 and 6) is, instead of being directly coupled to the deadbeam 220, operably coupled to the deadbeam 220 via a relatively small articulating link, which may be referred to as an "articulink" or decoupling link 272. The decoupling link 272 may be operably coupled to the deadbeam 220 via a deadbeam bushing 274. The decoupling link 272 acts to decouple caster stiffness from roll stiffness, and therefore provides a better roll stiffness versus caster stiffness tradeoff for the example of FIG. 7 relative to the example of FIGS. 5 and 6. Moreover, the example of FIG. 7 generally also provides increased RTI relative to the example of FIGS. 5 and 6.

Still better RTI may be achieved in some cases by shifting from the three-link designs of the examples of FIGS. 5-7 to a five-link design, which is shown in the block diagram of FIG. 4. An example of such a design is shown from various perspectives in FIGS. 8-11. Referring now to FIGS. 8-11, in which some components have been fully or partially removed to facilitate better visibility to other components that are discussed herein, a deadbeam 300 is again positioned rearward of an electric motor 310. The lateral link 142 of FIG. 4 is, in this example, provided by Panhard rod 320, which again extends rearward of the deadbeam 300 and is operably coupled to the deadbeam 300 at one end thereof, and to the chassis (e.g., a longitudinal frame member 330) at the other end thereof.

In this example, the deadbeam 300 is operably coupled, at opposing ends thereof, to a corresponding cast knuckle 340 that houses wheel hub, bearings, brakes, etc. for each respective rear wheel. The solid axle 152 of FIG. 4 is, in this example, again embodied in the form of two half shafts 342 that extend from opposite lateral sides of the electric motor 310 to be operably coupled to the corresponding knuckle 340 on each opposing side of the vehicle. Similarly, in some cases, the deadbeam 300 may be linear over an entirety of the distance between the two half shafts 342. Each instance of the knuckle 340 is in turn operably coupled to a corresponding rear wheel of the vehicle. A damper or shock absorber 350 and spring assembly 352 are again provided for suspension purposes. However, the trailing arm 210 of the preceding examples has been replaced on each side of the vehicle by two longitudinal links.

The two longitudinal links on each side include an upper link 360 and a lower link 370. The upper link 360 may be operably coupled to the deadbeam 300 via a deadbeam bracket 362 at a rear end of the upper link 360, and may be operably coupled to the chassis (e.g., to the longitudinal frame member 330 or another frame member) via a bracket (not shown) at a forward end thereof. Although not required, the upper link 360 of some embodiments may be attached to a front portion or side of the deadbeam 300 and may extend at an angle such that elevation of the upper link 360 rises as the upper link 360 extends in a rearward direction (i.e., toward the deadbeam 300).

The lower link 370 may be operably coupled to the deadbeam 300 via a second deadbeam bracket 372 at a rear end of the lower link 370, and may be operably coupled to the chassis (e.g., to the longitudinal frame member 330 or another frame member) via a bracket (not shown) at a forward end thereof. Meanwhile, again although not required, the lower link 370 of some embodiments may be attached to a rear portion or side of the deadbeam 300 and may extend at an angle such that elevation of the lower link 370 decreases as the lower link 370 extends in a rearward direction (i.e., toward the deadbeam 300). In the example shown, the lower link 370 is also longer than the upper link 360. However, the relative lengths could alternatively be swapped, or may be equal in alternative embodiments.

A vehicle suspension system for upgraded vehicle suspension may therefore be provided. The vehicle suspension system may include a deadbeam extended between a first wheel at a first end of the deadbeam and a second wheel at a second end of the deadbeam, an electric motor disposed proximate to the deadbeam (e.g., forward or rearward of the deadbeam), a lateral link operably coupling the deadbeam to a chassis of the vehicle, a first half shaft operably coupled to the first wheel and the electric motor, a second half shaft operably coupled to the second wheel and the electric motor, a first suspension assembly operably coupling the first wheel to the chassis, and a second suspension assembly operably coupling the second wheel to the chassis.

The suspension system of some embodiments may include additional features, modifications, augmentations and/or the like to achieve further objectives or enhance performance of the assembly. The additional features, modifications, augmentations and/or the like may be added in any combination with each other. Below is a list of various additional features, modifications, and augmentations that can each be added individually or in any combination with each other. For example, the lateral link may be a Panhard rod Watt's linkage, Mumford, linkage, or Scott-Russell linkage. In some cases, the Panhard rod may be disposed rearward of the deadbeam. In an example embodiment, the first suspension assembly and the second suspension assembly may each include a spring and/or a damper along with one or more longitudinal links operably coupling the deadbeam to the chassis. In one three-link example embodiment, the first suspension assembly may include a radius arm operably coupled to the chassis at a first bushing assembly, and operably coupled to the deadbeam via a second bushing assembly and a third bushing assembly (and the second suspension assembly may mirror the first suspension assembly). In an alternative three-link example embodiment, the first suspension assembly may include a radius arm operably coupled to the chassis at a first bushing assembly at a forward end of the radius arm, and operably coupled to the deadbeam via a decoupling link disposed proximate a rearward end of the radius arm (and the second suspension assembly may mirror the first suspension assembly). In a five-link example embodiment, the first suspension assembly may include an upper link extending above the first half shaft between the chassis and a first portion of the deadbeam, and a lower link extending below the first half shaft between the chassis and a second portion of the deadbeam. In some cases, the first portion of the deadbeam may be disposed at a rear and top portion of the deadbeam. In an example embodiment, the second portion of the deadbeam may be disposed at a front and bottom portion of the deadbeam. In some cases, the upper link may be disposed at an angle to increase in elevation (e.g., relative to the horizontal plane) extending from the chassis toward the deadbeam. In an example embodiment, the lower link is disposed at an angle to decrease in elevation extending from the chassis toward the deadbeam.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A vehicle suspension system comprising:
   a deadbeam extended between a first wheel at a first end of the deadbeam and a second wheel at a second end of the deadbeam;
   an electric motor disposed proximate to the deadbeam;
   a lateral link operably coupling the deadbeam to a chassis of the vehicle;
   a first half shaft operably coupled to the first wheel and the electric motor;
   a second half shaft operably coupled to the second wheel and the electric motor;

a first suspension assembly operably coupling the first wheel to the chassis; and a second suspension assembly operably coupling the second wheel to the chassis, wherein the deadbeam is disposed entirely rearward of the electric motor, wherein the first suspension assembly and the second suspension assembly each comprise one or more longitudinal links operably coupling the deadbeam to the chassis, wherein the one or more longitudinal links extend from a position forward of the first and second half shafts, past the first and second half shafts, to a position rearward of the first and second half shafts where the one or more longitudinal links operably couple to the deadbeam rearward of the first and second half shafts, and wherein the deadbeam extends linearly at least from the first half shaft to the second half shaft, wherein the first suspension assembly comprises an upper link extending above the first half shaft between the chassis and a first portion of the deadbeam, and a lower link extending below the first half shaft between the chassis and a second portion of the deadbeam.

2. The system of claim 1, wherein the lateral link comprises a Panhard rod, Watt's linkage, Mumford linkage, or Scott-Russell linkage.

3. The system of claim 1, wherein the lateral link comprises Panhard rod that is disposed rearward of the deadbeam.

4. The system of claim 1, wherein the first suspension assembly and the second suspension assembly each further comprise a spring and/or damper.

5. The system of claim 4, wherein the first suspension assembly comprises a radius arm operably coupled to the chassis at a first bushing assembly, and operably coupled to the deadbeam via a second bushing assembly and a third bushing assembly.

6. The system of claim 4, wherein the first suspension assembly comprises a radius arm operably coupled to the chassis at a first bushing assembly at a forward end of the radius arm, and operably coupled to the deadbeam via a decoupling link disposed proximate a rearward end of the radius arm.

7. The system of claim 1, wherein the first portion of the deadbeam is disposed at a rear and top portion of the deadbeam.

8. The system of claim 1, wherein the second portion of the deadbeam is disposed at a front and bottom portion of the deadbeam.

9. The system of claim 1, wherein the upper link is disposed at an angle to increase in elevation extending from the chassis toward the deadbeam.

10. The system of claim 1, wherein the lower link is disposed at an angle to decrease in elevation extending from the chassis toward the deadbeam.

11. A five-link vehicle suspension system comprising:

a deadbeam extended between a first wheel at a first end of the deadbeam and a second wheel at a second end of the deadbeam;

an electric motor disposed proximate to the deadbeam;

a lateral link operably coupling the deadbeam to a chassis of the vehicle, the lateral link comprising a first link of the system;

a first half shaft operably coupled to the first wheel and the electric motor;

a second half shaft operably coupled to the second wheel and the electric motor;

a first suspension assembly operably coupling the first wheel to the chassis, the first suspension assembly including a first upper link comprising a second link of the system and a first lower link comprising a third link of the system, the second link passing over the first half shaft and the third link passing under the first half shaft extending between the chassis and a portion of the deadbeam proximate the first wheel; and a second suspension assembly operably coupling the second wheel to the chassis, the second suspension assembly including a second upper link comprising a fourth link of the system and a second lower link comprising a fifth link of the system, the fourth link passing over the second half shaft and the fifth link passing under the second half shaft extending between the chassis and a portion of the deadbeam proximate the second wheel, wherein the deadbeam is disposed entirely rearward of the electric motor, wherein the second, third, fourth and fifth links of the system extend from a position forward of the first and second half shafts, past the first and second half shafts, to a position rearward of the first and second half shafts where the second, third, fourth and fifth links of the system operably couple to the deadbeam rearward of the first and second half shafts, and wherein the deadbeam extends linearly at least from the first half shaft to the second half shaft.

12. The five-link vehicle suspension system of claim 11, wherein the lateral link comprises a Panhard rod, Watt's linkage, Mumford linkage, or Scott-Russell linkage.

13. The five-link vehicle suspension system of claim 11, wherein the lateral link comprises a Panhard rod that is disposed rearward of the deadbeam.

14. The five-link vehicle suspension system of claim 11, wherein the first and second upper links are each disposed at an angle to increase in elevation extending from the chassis toward the deadbeam.

15. The five-link vehicle suspension system of claim 11, wherein the first and second lower links are disposed at an angle to decrease in elevation extending from the chassis toward the deadbeam.

* * * * *